US012704324B2

(12) United States Patent
Ko et al.

(10) Patent No.: US 12,704,324 B2
(45) Date of Patent: Aug. 11, 2026

(54) ELECTRODE DRYING SYSTEM

(71) Applicant: LG Energy Solution, Ltd., Seoul (KR)

(72) Inventors: Young-Kuk Ko, Daejeon (KR); Young-Gyu Moon, Daejeon (KR); Shin-Wook Jeon, Daejeon (KR); Sang-Hoon Choy, Daejeon (KR); Soon-Sik Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 641 days.

(21) Appl. No.: 18/033,602

(22) PCT Filed: Jul. 26, 2022

(86) PCT No.: PCT/KR2022/010990
§ 371 (c)(1),
(2) Date: Apr. 26, 2023

(87) PCT Pub. No.: WO2023/038288
PCT Pub. Date: Mar. 16, 2023

(65) Prior Publication Data

US 2023/0400253 A1 Dec. 14, 2023

(30) Foreign Application Priority Data

Sep. 8, 2021 (KR) ........................ 10-2021-0120041

(51) Int. Cl.
*F26B 21/37* (2026.01)
*F26B 13/00* (2006.01)
(Continued)

(52) U.S. Cl.
CPC ............ *F26B 21/37* (2026.01); *F26B 13/004* (2013.01); *F26B 21/20* (2026.01); *F26B 21/33* (2026.01); *F26B 21/35* (2026.01)

(58) Field of Classification Search
CPC ........ F26B 21/12; F26B 13/004; F26B 21/02; F26B 21/08; F26B 21/10
(Continued)

(56) References Cited

U.S. PATENT DOCUMENTS 2,972,196 A * 2/1961 Early .................. B41F 23/0486 34/248
4,771,728 A * 9/1988 Bergman, Jr. .......... F26B 3/283 118/643
(Continued)

FOREIGN PATENT DOCUMENTS

CN 203704683 U 7/2014
CN 104344707 A 2/2015
(Continued)

OTHER PUBLICATIONS

Partial EESR for European Application No. 22867557.5 dated Mar. 21, 2024.12 pgs.
(Continued)

*Primary Examiner* — Stephen M Gravini
(74) *Attorney, Agent, or Firm* — Lerner David LLP

(57) ABSTRACT

An electrode drying system includes a drying oven configured to dry a solvent in an electrode active material slurry on an electrode sheet in which the electrode active material slurry is applied to a current collector, an air supply member configured to supply air to the drying oven, and a ventilation member configured to discharge air from the drying oven. At least part of the air discharged from the ventilation member is introduced into the air supply member again.

10 Claims, 3 Drawing Sheets

(51) Int. Cl.

| | |
|---|---|
| ***F26B 21/20*** | (2026.01) |
| ***F26B 21/33*** | (2026.01) |
| ***F26B 21/35*** | (2026.01) |

(58) Field of Classification Search

USPC .............................................................. 34/529

See application file for complete search history.

(56) References Cited

U.S. PATENT DOCUMENTS

| | | | | |
|---|---|---|---|---|
| 5,136,790 | A | 8/1992 | Hagen et al. | |
| 5,659,972 | A * | 8/1997 | Min | F26B 13/104 34/524 |
| 5,915,815 | A * | 6/1999 | Moore | F26B 25/006 34/79 |
| 7,488,518 | B2 * | 2/2009 | Ortlieb | H01J 37/32192 427/512 |
| 10,199,635 | B2 * | 2/2019 | Ho | F26B 21/14 |
| 10,267,562 | B2 * | 4/2019 | Natsume | F26B 3/04 |
| 10,590,594 | B2 * | 3/2020 | Berdut-Teruel | F26B 11/00 |
| 11,788,789 | B2 * | 10/2023 | Nakano | F26B 15/18 34/545 |
| 12,209,805 | B2 * | 1/2025 | Kim | H01M 4/139 |
| 2005/0050755 | A1 | 3/2005 | Majima | |
| 2015/0086866 | A1 | 3/2015 | Park et al. | |
| 2022/0276001 | A1 | 9/2022 | Kim | |
| 2023/0400253 | A1 * | 12/2023 | Ko | F26B 13/002 |
| 2025/0207856 | A1 * | 6/2025 | Kim | G01P 5/07 |
| 2025/0230978 | A1 * | 7/2025 | Park | F26B 21/004 |

FOREIGN PATENT DOCUMENTS

| | | | | |
|---|---|---|---|---|
| CN | 211717103 | U | 10/2020 | |
| CN | 112138964 | A | 12/2020 | |
| CN | 212856488 | U | 4/2021 | |
| CN | 213811388 | U | 7/2021 | |
| CN | 116325199 | A * | 6/2023 | F26B 13/002 |
| EP | 0413517 | A2 | 2/1991 | |
| EP | 1515103 | A2 | 3/2005 | |
| EP | 4212808 | A1 * | 7/2023 | F26B 13/002 |
| JP | S5389670 | U | 7/1978 | |
| JP | S57-122274 | A | 7/1982 | |
| JP | 2003083678 | A | 3/2003 | |
| JP | 2004319117 | A | 11/2004 | |
| JP | 2007132602 | A | 5/2007 | |
| JP | 2011-080718 | A | 4/2011 | |
| JP | 2012097917 | A | 5/2012 | |
| JP | 2012181967 | A | 9/2012 | |
| JP | 2013088048 | A | 5/2013 | |
| JP | 2013104575 | A | 5/2013 | |
| JP | 5862880 | B2 | 2/2016 | |
| JP | 2023547116 | A * | 11/2023 | F26B 13/002 |
| KR | 101102915 | B1 | 1/2012 | |
| KR | 20120007198 | U | 10/2012 | |
| KR | 101264522 | B1 | 5/2013 | |
| KR | 20130137977 | A | 12/2013 | |
| KR | 101475429 | B1 | 12/2014 | |
| KR | 2021-0015278 | A | 2/2021 | |
| KR | 20210050721 | A | 5/2021 | |
| KR | 20230036930 | A * | 3/2023 | F26B 23/002 |
| WO | 2012088803 | A1 | 7/2012 | |

OTHER PUBLICATIONS

Extended European Search Report including Written Opinion for Application No. 22867557.5 dated Jul. 9, 24. 11 pgs.

Search Report dated Jun. 27, 2025 from the Office Action for Chinese Application No. 202280006612.4 issued Jun. 30, 2025, pp. 1-3.

Extended European Search Report including Written Opinion for Application No. 22867557.5 dated Dec. 5, 2024, 6 pages.

International Search Report for Application No. PCT/KR2022/010990 mailed Nov. 25, 2022. 4 pages.

* cited by examiner

Prior Art

ELECTRODE DRYING SYSTEM

CROSS REFERENCE TO RELATED APPLICATIONS

The present application is a national phase entry under 35 U.S.C. § 371 of International Application No. PCT/KR2022/010990 filed on Jul. 26, 2022, which claims priority from Korean Patent Application No. 10-2021-0120041 filed on Sep. 8, 2021, all of which are incorporated herein by reference.

TECHNICAL FIELD

The present disclosure relates to an electrode drying system, and more particularly, to an electrode drying system in which energy efficiency may be improved.

BACKGROUND ART

As technology development and demand for mobile devices have increased, the demand for secondary batteries as energy sources have rapidly increased. A secondary battery essentially includes an electrode assembly as a power generation element. An electrode assembly has a structure in which a positive electrode, a separator, and a negative electrode are stacked at least once, and the positive electrode and the negative electrode are manufactured by applying and drying a positive electrode active material slurry and a negative electrode active material slurry on current collectors formed of an aluminum foil and a copper foil, respectively.

FIG. 1 is a view schematically illustrating a conventional electrode drying system. Referring to FIG. 1, air supplied through an air supply fan 1 is provided to a drying oven 2 to dry electrodes, and then is discharged to the outside through an exhaust fan 3.

However, because the air discharged to the outside through the exhaust fan 3 after drying the electrodes in the drying oven 2 is high-temperature air, when the high-temperature air is discharged to the outside, a large amount of energy is also discharged, thereby leading to a waste of energy.

Also, because a negative electrode among the electrodes uses water as a solvent, the air discharged to the outside through the exhaust fan 3 after drying the electrodes in the drying oven 2 contains a lot of moisture.

Because a humidity of air supplied to the drying oven 2 is an important factor greatly affecting electrode drying quality along with a temperature, there is a demand for a method of reusing high-temperature and humid air discharged from the drying oven 2 in order to reduce a drying deviation according to a seasonal temperature or humidity difference.

DISCLOSURE

Technical Problem

The present disclosure is designed to solve the problems of the related art, and therefore the present disclosure is directed to providing an electrode drying system in which energy efficiency may be improved by reusing at least part of discharged air.

Technical Solution

In one aspect of the present disclosure, there is provided an electrode drying system including a drying oven configured to dry a solvent in an electrode active material slurry on an electrode sheet in which the electrode active material slurry is applied to a current collector, an air supply member configured to supply air to the drying oven, and a ventilation member configured to discharge air from the drying oven, wherein at least part of air discharged from the ventilation member is introduced into the air supply member again.

The air supply member and the ventilation member may communicate with each other.

The electrode drying system may include a vent member located between the ventilation member and the air supply member and configured to discharge part of air discharged from the ventilation member to outside.

The electrode drying system may include a humidity sensor located between the air supply member and the drying oven, a humidifying member provided to humidify air according to a humidity, and a control member configured to control the humidifying member according to a humidity detected by the humidity sensor.

The electrode drying system may include a temperature sensor located between the air supply member and the drying oven, a heater configured to heat air according to a temperature, and a control member configured to control the heater according to a temperature detected by the temperature sensor.

The electrode drying system may further include a flow rate control valve provided between the ventilation member and the air supply member and configured to control a flow rate of air discharged from the ventilation member.

The flow rate control valve may include at least one of an automatic control valve whose opening rate is automatically controlled by the control member and a manual control valve whose opening rate is manually controlled by an operator.

The vent member may include a first vent member connected to the automatic control valve, wherein the automatic control valve includes a first automatic control valve provided between the ventilation member and the air supply member, and a second automatic control valve provided between the ventilation member and the first vent member, wherein the first automatic control valve and the second automatic control valve are arranged to be orthogonal to each other.

The vent member may include a second vent member connected to the manual control valve, wherein the manual control valve includes a first manual control valve provided between the ventilation member and the air supply member, and a second manual control valve provided between the ventilation member and the second vent member, wherein the first manual control valve and the second manual control valve are arranged to be orthogonal to each other.

The electrode drying system may include a drain member provided between the ventilation member and the air supply member.

The drain member may be provided in a drain duct inclined downward from the ventilation member and inclined downward from the air supply member.

Advantageous Effects

According to embodiments of the present disclosure, at least part of high-temperature and humid air discharged from a ventilation member is introduced into an air supply member and is reused, thereby improving energy efficiency.

DETAILED DESCRIPTION

Figure 1:
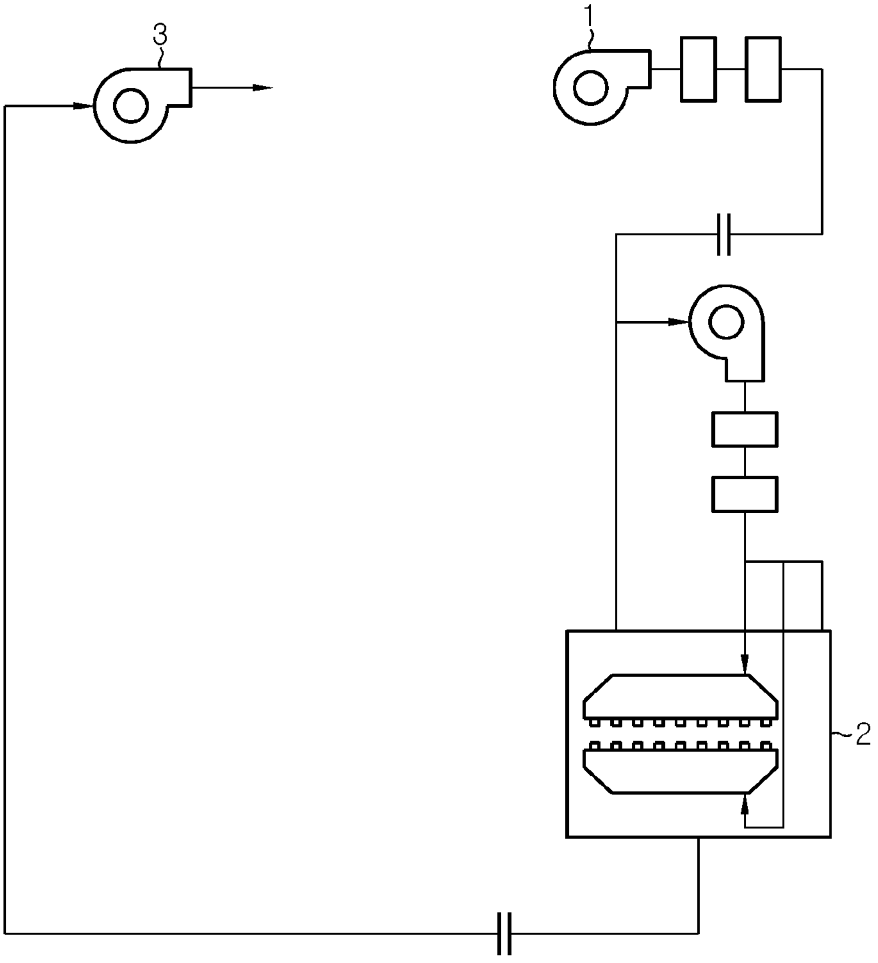
FIG. 1 is a view schematically illustrating a conventional electrode drying system.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The size of each element or a specific portion of the element shown in the drawings may be exaggerated, omitted or schematically drawn for the purpose of convenience and clarity of explanation. Accordingly, the size of each element may not substantially reflect its actual size. While describing the present disclosure, detailed descriptions of related well-known functions or configurations that may blur the points of the present disclosure are omitted.

Also, in the present specification, it will be understood that when elements are "connected" or "coupled" to each other, the elements may be directly connected or coupled to each other, or may be indirectly connected or coupled to each other with an intervening element therebetween.

Figure 2:
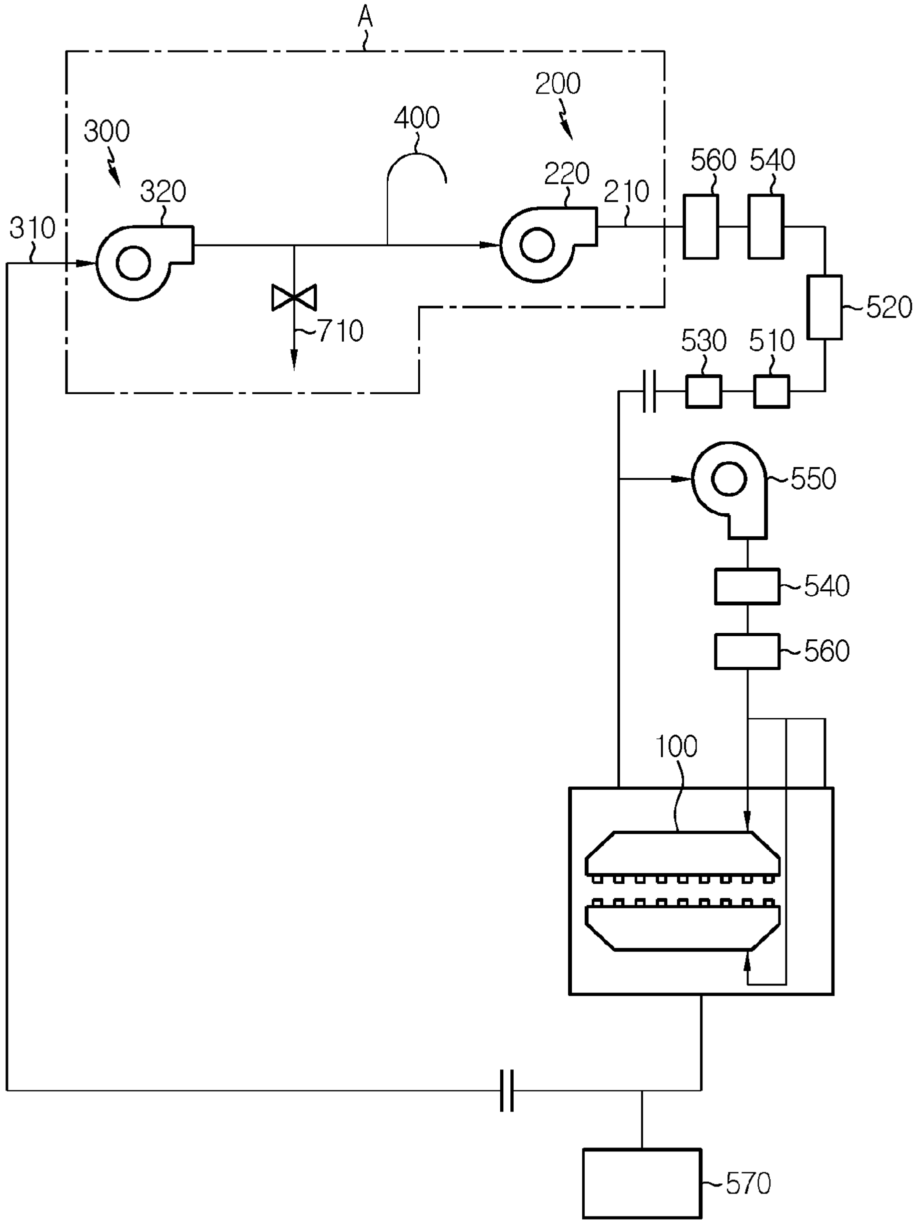
FIG. 2 is a view schematically illustrating an electrode drying system, according to an embodiment of the present disclosure.
Figure 3:
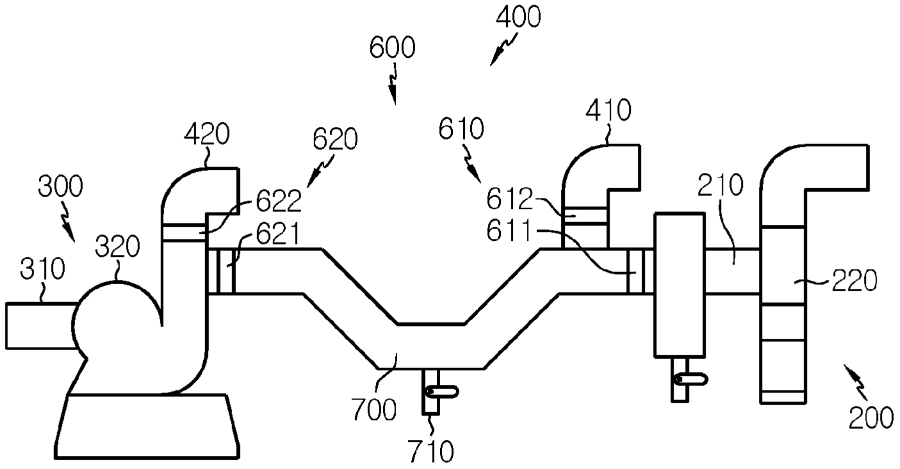
FIG. 3 is a view illustrating a portion A of FIG. 2, especially illustrating a state where a ventilation member and an air supply member are connected to each other.

FIG. 2 is a view schematically illustrating an electrode drying system, according to an embodiment of the present disclosure. FIG. 3 is a view schematically illustrating a portion A of FIG. 2, especially illustrating a state where a ventilation member and an air supply member are connected to each other.

Referring to FIGS. 2 and 3, an electrode drying system 10 according to an embodiment of the present disclosure includes a drying oven 100, an air supply member 200, and a ventilation member 300.

The drying oven 100 is provided to dry a solvent in an electrode active material slurry on an electrode sheet (not shown). As described above, a positive electrode and a negative electrode include electrode sheets (not shown) formed by applying electrode active material slurries, that is, a positive electrode active material slurry and a negative electrode active material slurry, on current collectors formed of an aluminum foil and a copper foil, respectively.

Because a solvent corresponding to a liquid component is included in the electrode active material slurry, the solvent included in the electrode active material slurry is dried in the drying oven 100. The drying oven 100 has a receiving space in which an electrode may be accommodated, and when the electrode is accommodated in the receiving space, hot air is blown to the electrode to dry the electrode.

The drying oven 100 is connected to the air supply member 200, and receives air from the air supply member 200. Because air supplied to the drying oven 100 through the air supply member 200 is high-temperature and humid air discharged from the ventilation member 300 and introduced into the air supply member 200 again, the air may be used in the drying oven 100.

A humidifying member 520 is provided between the drying oven 100 and the air supply member 200, and air supplied from the air supply member 200 to the drying oven 100 is supplied with moisture by the humidifying member 520 and is sprayed to an electrode when necessary.

Also, a heater 540 is provided between the drying oven 100 and the air supply member 200, and air supplied from the air supply member 200 to the drying oven 100 is heated by the heater 540 and is blown to the electrode.

Air supplied from the air supply member 200 to the drying oven 100 to dry the electrode is discharged through the ventilation member 300.

The air supply member 200 supplies air to the drying oven 100. The air supply member 200 may include an air supply duct 210 through which air moves, and an air supply fan 220 coupled to the air supply duct 210. That is, after external air moves to the air supply duct 210 due to an operation of the air supply fan 220, the external air is supplied to the drying oven 100 connected to the air supply duct 210.

The air supply member 200 is connected to the ventilation member 300. That is, the air supply member 200 and the ventilation member 300 may communicate with each other, and air supplied from the air supply member 200 to the drying oven 100 to dry the electrode and discharged to the ventilation member 300 may be supplied to the drying oven 100 again through the air supply member 200.

In this case, all of the air discharged from the ventilation member 300 may move to the air supply member 200, or only part of the air discharged from the ventilation member 300 may move to the air supply member 200.

A circulation fan 550 and a filter 560 may be provided between the air supply member 200 and the drying oven 100.

The ventilation member 300 is connected to the air supply member 200, and air moving from the drying oven 100 is discharged through the ventilation member 300. As described above, the ventilation member 300 may be connected to the air supply member 200 and may be configured so that all or part of air discharged through the ventilation member 300 moves to the air supply member 200.

The ventilation member 300 may include an exhaust duct 310 through which air is discharged, and an exhaust fan 320 coupled to the exhaust duct 310. Due to an operation of the exhaust fan 320, air may move from the exhaust duct 310 to the air supply duct 210, or air may be discharged from the exhaust duct 310 to the outside.

Referring to FIGS. 2 and 3, a vent member 400 is located between the ventilation member 300 and the air supply member 200, and is provided to discharge part of air discharged from the ventilation member 300 to the outside. That is, as described above, when the ventilation member 300 is provided so that only part of air discharged from the ventilation member 300 moves to the air supply member 200, the remaining air that does not move to the air supply member 200 is discharged to the outside through the vent member 400.

The vent member 400 may include a first vent member 410 and a second vent member 420. The first vent member 410 is connected to an automatic control valve 610 described below, and the second vent member 420 is connected to a manual control valve 620.

The electrode drying system 10 according to an embodiment of the present disclosure may include a humidity sensor 510, the humidifying member 520, and a control member 570. The electrode drying system 10 may also include a temperature sensor 530 and the heater 540.

The humidity sensor 510 is located between the air supply member 200 and the drying oven 100 and measures a humidity of air moving to the drying oven 100. The humidifying member 520 is provided to humidify air according to the humidity. The control member 570 is provided to control the humidifying member 520 according to the humidity detected by the humidity sensor 510.

The temperature sensor 530 is located between the air supply member 200 and the drying oven 100 and measures a temperature of air moving to the drying oven 100. The heater 540 is provided to heat air according to the temperature. The control member 570 is provided to control the heater 540 according to the temperature detected by the temperature sensor 530.

When the electrode is dried in the drying oven 100, both a temperature and a humidity of air are important factors affecting the quality of the electrode. However, because there is a temperature or humidity difference according to weather or season (in particular, summer and winter), non-drying or over-drying may occur during drying of the electrode.

For example, when both a humidity and a temperature of air are set based on summer, in winter, the humidifying member 520 for increasing a humidity of air supplied to the drying oven 100 is required and the heater 540 for increasing a temperature of air supplied to the drying oven 100 is also required.

However, because both the humidifying member 520 and the heater 540 need energy, the electrode drying system 10 according to an embodiment of the present disclosure moves high-temperature and humid air discharged from the ventilation member 300 to the air supply member 200 again and supplies the air to the drying oven 100 to reuse the air.

However, because the control member 570 controls the humidifying member 520 and the heater 540 according to a humidity and a temperature measured by the humidity sensor 510 and the temperature sensor 530 and uses the humidifying member 520 and the heater 540 only when necessary, the use of the heater 540 and the humidifying member 520 may be reduced, and thus, power consumption by the heater 540 and the humidifying member 520 may be reduced, thereby improving energy efficiency.

Referring to FIG. 3, a flow rate control valve 600 is provided between the ventilation member 300 and the air supply member 200 to control a flow rate of air discharged from the ventilation member 300.

The flow rate control valve 600 may include at least one of the automatic control valve 610 whose opening rate is automatically controlled by the control member 570 and the manual control valve 620 whose opening rate is manually controlled by an operator.

The automatic control valve 610 may include a first automatic control valve 611 and a second automatic control valve 612. The first automatic control valve 611 is provided between the ventilation member 300 and the air supply member 200. The second automatic control valve 612 is provided between the ventilation member 300 and the first vent member 410.

The first automatic control valve 611 and the second automatic control valve 612 may be orthogonal to each other, accurately move air in any one of a direction in which the air is discharged to the outside and a direction in which the air is supplied to the drying oven 100.

The manual control valve 620 may include a first manual control valve 621 and a second manual control valve 622. The first manual control valve 621 is provided between the ventilation member 300 and the air supply member 200. The second manual control valve 622 is provided between the ventilation member 300 and the second vent member 420.

The first manual control valve 621 and the second manual control valve 622 may be orthogonal to each other, to accurately move air in any one of a direction in which the air is discharged from the ventilation member 300 to the outside and a direction in which the air is supplied to the drying oven 100.

Referring to FIG. 3, a drain duct 700 may be inclined downward from the exhaust duct 310 of the ventilation member 300, and may also be inclined downward from the air supply duct 210 of the air supply member 200.

A drain member 710 may be provided between the ventilation member 300 and the air supply member 200, for example, in the drain duct 700.

As described above, because air discharged from the ventilation member 300 is high-temperature and humid air, condensation may occur in various ducts including the air supply duct 210 and the exhaust duct 310 in winter. Also, in order to discharge the condensation, the drain duct 700 is provided between the air supply duct 210 and the exhaust duct 310 and the drain member 710 discharges the condensation through the drain duct 700.

That is, the drain duct 700 for discharging condensation occurring when the ventilation member 300 is connected to the air supply member 200 may not be required when the ventilation member 300 and the air supply member 200 are not connected to each other.

The operation and effect of the electrode drying system 10 according to an embodiment of the present disclosure will be described with reference to the drawings.

Referring to FIG. 2, because the ventilation member 300 and the air supply member 200 communicate with each other, high-temperature and humid air moving to the drying oven 100 through the air supply member 200 to dry an electrode and then discharged to the ventilation member 300 may move to the drying oven 100 again through the air supply member 200 and may be used to dry the electrode.

That is, because air discharged from the ventilation member 300 is reused to dry the electrode, the humidifying member 520 and the heater 540 may be used only when necessary, thereby improving energy efficiency.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

INDUSTRIAL APPLICABILITY

The present disclosure relates to an electrode drying system of a secondary battery, and particularly, may be used in industries related to secondary batteries.

What is claimed is:

1. An electrode drying system comprising:

a drying oven configured to dry a solvent in an electrode active material slurry disposed on a current collector;

an air supply member configured to supply air to the drying oven; and a ventilation member configured to discharge the air from the drying oven, wherein the air supply member is in communication with the ventilation member such that at least a portion of the air discharged from the ventilation member is configured to be introduced into the air supply member again.

2. The electrode drying system according to claim 1, further comprising a vent member located between the ventilation member and the air supply member, wherein the vent member is configured to discharge a part of the air discharged from the ventilation member to an exterior of the electrode drying system.

3. The electrode drying system according to claim 2, further comprising:

a humidity sensor located between the air supply member and the drying oven;

a humidifying member configured to humidify the air; and a control member configured to control the humidifying member according to a humidity detected by the humidity sensor.

4. The electrode drying system according to claim 2, further comprising:

a temperature sensor located between the air supply member and the drying oven;

a heater configured to heat the air to a set temperature; and a control member configured to control the heater according to a temperature detected by the temperature sensor.

5. The electrode drying system according to claim 1, further comprising a flow rate control valve positioned between the ventilation member and the air supply member, wherein the flow rate control valve is configured to control a flow rate of the air discharged from the ventilation member.

6. The electrode drying system according to claim 5, wherein the flow rate control valve comprises at least one of an automatic control valve and a manual control valve, wherein an opening rate of the automatic control valve is configured to be automatically controlled by a control member; and wherein an opening rate of the manual control valve is configured to be manually controlled by an operator.

7. The electrode drying system according to claim 6, wherein a vent member comprises a first vent member in communication with the automatic control valve, wherein the automatic control valve comprises:

a first automatic control valve provided between the ventilation member and the air supply member; and a second automatic control valve provided between the ventilation member and the first vent member, wherein the first automatic control valve and the second automatic control valve are disposed orthogonally to each other.

8. The electrode drying system according to claim 6, wherein a vent member comprises a second vent member in communication with the manual control valve, wherein the manual control valve comprises:

a first manual control valve provided between the ventilation member and the air supply member; and a second manual control valve provided between the ventilation member and the second vent member, wherein the first manual control valve and the second manual control valve are disposed orthogonally to each other.

9. The electrode drying system according to claim 1, further comprising a drain member provided between the ventilation member and the air supply member.

10. The electrode drying system according to claim 9, wherein the drain member is provided in a drain duct, wherein the drain duct is inclined downward from the ventilation member and inclined downward from the air supply member.

* * * * *